(12) United States Patent
Bertorelle et al.

(10) Patent No.: US 8,254,332 B2
(45) Date of Patent: Aug. 28, 2012

(54) METHOD AND SYSTEM FOR RADIO ACCESS TECHNOLOGY MONITORING IN A WIRELESS COMMUNICATIONS SYSTEM

(75) Inventors: Jerome Bertorelle, Paris (FR); Bertrand Muquet, Saint Germain En Laye (FR); Stephane Gosne, Asnieres sur Seine (FR); Ambroise Popper, Menlo Park, CA (US); Jeremy Gosteau, Paris (FR)

(73) Assignee: Sequans Communications, Puteaux (FR)

( * ) Notice: Subject to any disclaimer, the term of this patent is extended or adjusted under 35 U.S.C. 154(b) by 660 days.

(21) Appl. No.: 12/416,636

(22) Filed: Apr. 1, 2009

(65) Prior Publication Data

US 2009/0274121 A1    Nov. 5, 2009

(30) Foreign Application Priority Data

Apr. 1, 2008  (EP) .................................... 08103300

(51) Int. Cl.
    *H04W 4/00* (2009.01)
(52) U.S. Cl. ...................................................... 370/331
(58) Field of Classification Search .................. 370/203, 370/204–215, 229–240, 241–253, 310–337, 370/338–350, 395.1, 395.3, 395.4, 395.41, 370/395.42, 395.5, 395.52, 395.53, 412–421, 370/431–457, 458–463, 464–497, 498–529
    See application file for complete search history.

(56) References Cited

U.S. PATENT DOCUMENTS

| | | | |
|---|---|---|---|
| 7,499,431 B2 * | 3/2009 | Wang et al. ................... 370/331 |
| 7,783,300 B2 * | 8/2010 | Sinha ......................... 455/456.1 |
| 7,929,912 B2 * | 4/2011 | Sherman ....................... 455/41.2 |
| 2003/0108027 A1 | 6/2003 | Kim et al. |
| 2006/0223557 A1 | 10/2006 | Manohar |
| 2006/0229090 A1 * | 10/2006 | LaDue ........................... 455/507 |
| 2007/0110022 A1 | 5/2007 | Palenius et al. |
| 2007/0140163 A1 * | 6/2007 | Meier et al. ................... 370/329 |

(Continued)

FOREIGN PATENT DOCUMENTS

WO    2008000914 A1    1/2008

OTHER PUBLICATIONS

European Search Report of Counterpart Application No. EP 08/103300.3 Filed on Apr. 1, 2008.

*Primary Examiner* — Kwang B Yao
*Assistant Examiner* — Jung-Jen Liu
(74) *Attorney, Agent, or Firm* — Westman, Champlin & Kelly, P.A.; David D. Bush (57) ABSTRACT

A method and apparatus are provided for radio access technology (RAT) monitoring, in a wireless system environment having wireless communications equipment and at least two different RATs that coexist for providing to the equipment access to one or more communications networks. The equipment has at least two subsystems, each adapted for establishing and maintaining an active communications connection with a certain one of the different RATs. The equipment selects at least a first RAT, among all the RATs available in a certain geographical area, for establishing the active communications connection, according to a monitored characteristic of the first RAT. The method includes scanning a characteristic of a second RAT available for communication in the geographical area while the equipment maintains an active communications connection with the first RAT, and performing the scanning step when the equipment does not transmit signals through the active communications connection maintained with the first RAT.

14 Claims, 7 Drawing Sheets

U.S. PATENT DOCUMENTS

| | | | |
|---|---|---|---|
| 2007/0147242 A1* | 6/2007 | Marilly et al. | 370/230 |
| 2007/0160017 A1* | 7/2007 | Meier et al. | 370/338 |
| 2007/0232358 A1* | 10/2007 | Sherman | 455/560 |
| 2008/0205342 A1* | 8/2008 | Radhakrishnan et al. | 370/331 |
| 2008/0205365 A1* | 8/2008 | Russell et al. | 370/341 |
| 2008/0285504 A1* | 11/2008 | Lin | 370/319 |
| 2009/0081962 A1* | 3/2009 | Sohrabi | 455/79 |
| 2009/0180451 A1* | 7/2009 | Alpert et al. | 370/338 |
| 2009/0196210 A1* | 8/2009 | Desai | 370/311 |
| 2009/0213773 A1* | 8/2009 | Yoon et al. | 370/311 |
| 2009/0213804 A1* | 8/2009 | Yoon et al. | 370/329 |
| 2010/0150110 A1* | 6/2010 | Dutta et al. | 370/331 |

* cited by examiner

METHOD AND SYSTEM FOR RADIO ACCESS TECHNOLOGY MONITORING IN A WIRELESS COMMUNICATIONS SYSTEM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates generally to the field of wireless communications networks in which at least two different radio access technologies (RAT) coexist in a certain geographical area for providing wireless communications service, e.g. in a multi-standard wireless environment, and more particularly, to a method and system for RAT monitoring in a wireless communications system.

BACKGROUND OF THE DISCLOSURE

In the last years, an increasing number of wireless communications standards have emerged to provide data and/or voice communication services according to specific needs and quality of service; a mobile user or a mobile communications device may therefore have nowadays the possibility to wirelessly communicate with another user or another communications device using one of the available communications standards which best suites its needs. Usually, the geographic area in which said wireless communications services are available overlaps, and therefore, it is an increasing common situation to find locations in which the mobile user or mobile communications device has the option to select between two or more wireless communications standards for establishing a communications connection or session. Although sometimes two standards for communication may use the same or similar frequencies, the RAT or communications protocol, between the mobile communications device and the radio infrastructure that gives access to a certain communications network, is different, and consequently, the mobile user or mobile communications device has a need to monitor, in a certain location, both a certain number of possible RATs available for establishing a communications connection and a quality of service associated to said RATs.

Figure 1:
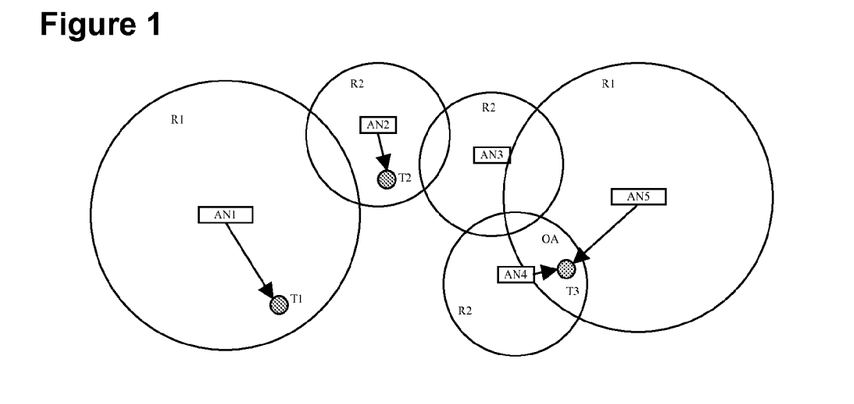
FIG. 1 shows a wireless cellular communications environment in which two different RATs are available for communications service.

The above is illustrated in the example of FIG. 1, which shows a typical wireless communications environment comprising two RATs R1 and R2 available for communications service with three wireless communications equipments T1 to T3. Access nodes AN1 and AN5 enable access, each in a certain cell area, according to a first RAT R1, and access nodes AN2 to AN4 provide access, each in a certain cell area, according to a second RAT R2. Therefore, the options for establishing a certain communications connection with the first or the second RAT will depend on the cell area coverage of each access node AN1 to AN5 and on the location of the wireless communications equipment T1 to T3, for example, wireless communications equipment T1 can establish a communications connection with access node AN1 according to the first RAT R1, wireless communications equipment T2 can establish a communications connection with access node AN2 according to the second RAT R2, and wireless communications equipment T3 can establish a communications link with access node AN5 or AN4 according to the first RAT or the second RAT respectively.

Access nodes AN1 to AN5 may be either base stations or access points, depending on the terminology generally used for a certain RAT, such as, for example, WiMAX, WiFi, GSM, UMTS or Bluetooth. If we consider, for example, that the first RAT R1 is a WiMAX access technology and the second RAT R2 being a WiFi access technology, a wireless communications equipment, for example T2, which is located in an area covered only by a WiFi access point AN2, will use a WiFi communications connection with said access point to access the internet; a wireless communications equipment, for example T1, which is located in an area covered only by a WiMAX base station AN1, will use a WiMAX communications connection to access the internet; and a wireless communications equipment, for example T3, which is located in an area covered by both systems WiFi-WiMAX, will, when the corresponding functionality is enabled, select the best radio technology for establishing a communications connection, depending on a certain criterion, e.g. a preferred internet provider, a radio maximizing the throughput or minimizing the power consumption, etc. For the latter use, the wireless communications equipment may be either a bi-mode WiFi-WiMAX equipment or a dual mode WiFi-WiMAX equipment. In bi-mode equipments, only one connection is established at any given time for communication through one or the other RAT and no seamless handover between access nodes of different RATs is possible (the system will first close a certain connection before establishing another connection using a second radio technology, therefore breaking the high level link, e.g. the IP connection). In dual mode equipments, on the other hand, handover from a first RAT to a second RAT is possible without breaking the high level IP connection thanks to the wireless communications equipment capability to establish and maintain two connections at the same time (one with each RAT) during the handover process.

Therefore, there is an increasing need to develop methods and systems which deal with the coexistence of two or more RATs in multi-standard wireless communications environments. Patent application US 2007/0160017 discloses, for example, a system and method for seamlessly roaming in a multi-protocol wireless network environment (e.g. a WiMAX-WiFi environment). The solution proposes a dual-mode mobile station that establishes one communications connection with a certain RAT and, when said RAT is not a preferred one (e.g. the first RAT belongs to a long-range wireless communication protocol), the mobile station checks for the availability of a preferred (e.g. short-range) RAT; and when said preferred RAT is available the mobile station establishes a connection to the access node which offers the preferred communications service. Nevertheless, the above document is silent about how to carry out the method to monitor an access node that offers the preferred communications service. Additionally, no monitoring of the quality of service of the preferred RAT link is done before switching the communications connection to the preferred RAT.

It shall be understood that the most basic approach that could be considered for doing RAT monitoring would be to use some received signal strength indicators (RSSI) that are generally available at the wireless communications equipment's radio frequency (RF) chains, which provide the level of power received on a certain RAT channel. However this would only indicate that there is some activity on that RAT channel, which is not enough in practice, since an activity detected through an RSSI can correspond to a signal transmitted by a mobile device rather than by an access point (AP) or a base station (BS). Therefore, this solution will not be a reliable indicator of the quality of a RAT channel. Besides even if this activity would correspond to that of, e.g. a WiFi AP or of a WiMAX BS, this would not be enough since some information about the AP/BS and the network are necessary to know if a channel can indeed be used (e.g., whether the AP/BS pertains to an authorized internet provider). This information is typically contained inside specific messages transmitted by the BS or by the AP and monitoring would also consist in decoding these messages in addition to synchronizing to the BS or to the AP.

To better illustrate the problem associated with RAT monitoring, we will consider in the following the issue of monitoring a WiFi RAT while the wireless communications equipment has established a communications connection with a WiMAX RAT. WiFi monitoring would comprise successively scanning all the available WiFi channels in order to select the best available channel for establishing a communications connection. WiFi scanning can be done in two ways: either passively or actively, according to section 11.1.3 of IEEE Std. 812.11™-2007, "IEEE Standard for Information Technology —Telecommunications and information exchange between systems—Local and metropolitan area networks—Specific requirements—Part 11: Wireless LAN Medium Access Control (MAC) and Physical Layer (PHY) Specifications", Approved 8 Mar. 2007. Passive WiFi scanning comprises decoding a message periodically sent by the AP, known as beacon, containing all the WiFi cell and network characteristics. By decoding the beacons, the wireless communications equipment knows if a certain channel corresponds to its network provider or home AP and whether it can be used to establish a communications connection with the network. Therefore, at the end of the scanning process, the wireless communications equipment knows which WiFi channels are available and is able to select the best one to establish a connection with the best AP. Since beacons are typically sent every 100 ms, a complete passive scanning will require, considering there are 15 channels, a very long time, about 1.5 s. In order to speed up the process, active WiFi scanning may be used as an alternative. In this case, the wireless communications equipment sends probe messages to test a certain channel and the AP will respond to this request by sending a probe response to the wireless communications equipment containing the information required to establish the communications connection.

Figure 2:
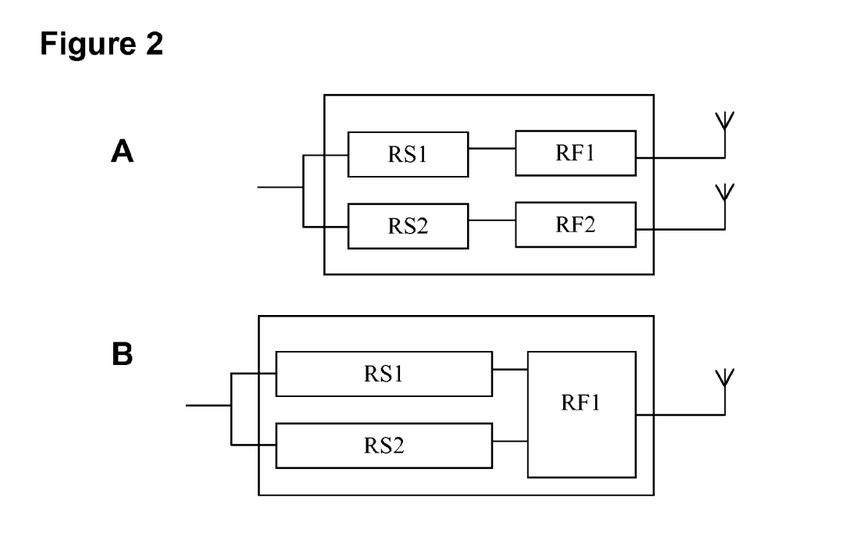

In a wireless communications equipment comprising two collocated RF chains, i.e. a RF interface RF1 and RF2 and antenna for each RAT subsystem RS1 and RS2, as illustrated in FIG. 2A, WiFi scanning while the equipment has an established WiMAX connection can be done if the equipment activates the two RF chains simultaneously. The problem with this approach is that, in such a case, a WiMAX signal transmission may prevent active or passive WiFi scanning by disturbing the reception of the WiFi beacon or probe response and, on the other hand, a WiFi signal transmission (when undertaking active WiFi scanning) may harm reception of WiMAX signals. This phenomenon is generally known as "illumination" in the field of cellular communications, wherein a signal transmitted by a base station to a first wireless communications equipment may be completely hidden (illuminated) by the transmission of a second wireless communications equipment that is located very close to the first wireless communications equipment.

In case a passive WiFi scanning is done while the equipment has an established WiMAX connection, the transmission of a WiMAX signal by the wireless communications equipment during the reception of a WiFi beacon would illuminate that beacon. Thus, since passive WiFi scanning requires the decoding of an entire beacon which is periodically sent by the AP every 100 ms and whose duration may vary from 0.1 ms to 2 ms, the probability to decode a beacon would be severely reduced and the overall scanning duration would be largely increased. This solution therefore increases power consumption and is disadvantageous when battery run time is a critical issue. Besides, since a frame duration in WiMAX is typically 5 ms and the beacon periodicity is typically 100 ms, in some cases such an illumination phenomenon would completely prevent the beacon reception since the two durations are integer multiples.

Alternatively, carrying active WiFi scanning while the wireless communications equipment has an established WiMAX connection speeds up the scanning process and reduces power consumption, but on the other hand, WiFi transmission signals disturb or illuminate the established WiMAX connection. Besides, as already indicated for passive WiFi scanning, WiMAX transmission signals disturb the reception of the AP probe response messages.

A possible solution for the above indicated problems could be to properly isolate the two RF chains so that each chain can transmit independently without disturbing the other one. Unfortunately the frequency bands of WiFi and WiMAX are close enough to impose severe isolation constraints between the two RF chains (more than 55 dB of isolation). This would require expensive RF filters and require special care on the design of wireless communications equipments which would considerably increase their unit price.

Additionally, illumination is not only an issue when doing WiFi monitoring in a wireless communications equipment with two RF chains as illustrated in FIG. 2A, since the same phenomenon can occur when WiMAX monitoring is carried while the wireless communications equipment has established a connection with a WiFi RAT. As a consequence, WiMAX scanning can suffer similar problems as the ones indicated for passive or active WiFi scanning.

Furthermore, for a wireless communications equipment comprising only one RF chain, i.e. a single RF interface RF1 and antenna, which is shared by the two RAT subsystems RS1, RS2, as illustrated in FIG. 2B, there is not known solution which allows WiMAX or WiFi scanning without breaking an established active WiFi or WiMAX connection, respectively.

SUMMARY

In view of the drawbacks of the prior art, an exemplary but non-limiting example of the present disclosure aims to provide an improved method and system for RAT monitoring.

An example method and apparatus of the present disclosure may be used in bi-mode or dual mode wireless communication equipment, which, when located in a geographical location in which two different RATs are available for communication, are able to establish and maintain communications connection with a first RAT and monitor the second RAT without breaking the active established connection with the first RAT. Advantageously, said monitoring of the second RAT is performed without disturbing or interfering the active established communications connection with the first RAT, thus not wasting air interface communications resources, and improving communications throughput and the overall quality of service. Also advantageous is the fact that the active established communications connection with the first RAT does not interfere or disturb the monitoring of the second RAT and thus the monitoring time period can be optimized and consequently, power consumption can be reduced in the wireless communications equipment. Another advantage is that said RAT monitoring mechanism can be performed autonomously by the wireless communications equipment, such that, even in the case that said equipment has established a communications connection with a first RAT, it will be able to periodically determine complete information about the characteristics and quality of service of a second alternative RAT. Said determined information about said alternative RAT can be used, for example, for deciding whether to initiate a hard or soft handover to said alternative RAT when a certain criterion is fulfilled. Furthermore, the method can be advantageously implemented in wireless communications equipments comprising only one RF chain, which is shared by two RAT subsystems, each dedicated for transmission/reception according to a certain radio technology.

According to a first aspect of the disclosure, a method for RAT monitoring is defined, in a wireless system environment comprising a wireless communications equipment and at least two different RATs that coexist for providing to said wireless communications equipment access to one or more communications networks for communications service; the wireless communications equipment comprising at least two electronic subsystem means, each adapted for establishing and maintaining an active communications connection with a certain one of said at least two different RATs; the wireless communications equipment selecting at least a first RAT, among all the RATs available in a certain geographical area, for establishing said at least one active communications connection, according to at least one monitored characteristic of said at least one first RAT; the monitoring method comprising a scanning step of at least one characteristic of a second RAT available for communication in said geographical area while the wireless communications equipment maintains an active communications connection with a first RAT, and wherein the scanning step of the at least one characteristic of the second RAT is performed when the wireless communications equipment does not transmit signals through said active communications connection maintained with the first RAT.

Advantageously, the wireless communications equipment transmits only alternatively, i.e. using only one RF chain at any given time for communication with a first or a second RAT, thus avoiding disturbance between the two collocated radio technologies.

According to another aspect of the disclosure, the method for RAT monitoring comprises determining an absence of transmitted signals in the active communications connection maintained between a first electronic subsystem means of the wireless communications equipment and the first RAT, and providing an indication to a second electronic subsystem means of said wireless communications equipment when said absence of transmitted signals is determined. Said indication can be used therefore to initiate scanning of the second RAT.

According to another embodiment, determining an absence of transmitted signals in the active communications connection comprises determining a duration and/or type of absence of transmitted signals according to a communications protocol of the first RAT, and the indication provided to the second electronic subsystem means comprises information about said determined duration and/or type. In this way, the second electronic subsystem means may decide when to initiate scanning of the second RAT.

According to still another embodiment, determining an absence of transmitted signals in the active communications connection comprises determining a certain duration and/or type of absence of transmitted signals according to a communications protocol of the first RAT, and the indication to the second electronic subsystem means is provided when said certain duration and/or type is determined. In this way, the first electronic subsystem means may decide when to provide an indication to the second electronic subsystem means to initiate the scanning of the second RAT, e.g. when a suitable period duration and/or type is determined.

In another specific embodiment, the wireless communications equipment sets a duration of a period in which it does not transmit signals through said active communications connection maintained with said first RAT, by sending a request message comprising said period duration to an access node providing said first RAT communications service. This is advantageous since the wireless communications equipment can control said duration, which previously was a default connection value. The duration of said period of absence may be even set depending on a periodicity of broadcast information sent by the access nodes providing said second RAT communications service and located in the neighborhood of the wireless communications equipment, e.g. depending on the frequency at which said access nodes send a beacon signal. Knowing this interval helps the wireless communications equipment to determine the optimum duration of transmission absence necessary for doing a suitable scanning of said second RAT.

According to a further embodiment, the wireless communications equipment sets a type of a period in which it does not transmit signals through said active communications connection maintained with said first RAT, by sending a request message comprising said period type to an access node providing said first RAT communications service. This is advantageous since, in this way, the wireless communications equipment does not have to passively wait for a certain type of transmission absence for doing the scanning of the second RAT. According to this embodiment the wireless communications equipment can advantageously control the point in time in which to perform scanning of the other RAT, e.g. at predetermined periodic intervals or when it is requested by the user, thus avoiding scanning the second RAT in an arbitrary point in time, e.g. when a certain transmission absence in the active communications connection type happens to occur.

In still another embodiment, a second electronic subsystem means of the wireless communications equipment provides an indication when it initiates the scanning step of the at least one characteristic of the second RAT, and said indication is used to block the transmission of signals in the active communications connection maintained between a first electronic subsystem means of the wireless communications equipment and the first RAT.

According to a specific embodiment, the first RAT is a WiMAX access network and the active communications connection is a WiMAX connection, according to an IEEE 802.16e communications standard. The type of the periods which the wireless communications equipment may determine, select or set, according to an aspect of the disclosure, are WiMAX sleep, scan or idle absence periods.

According to another specific embodiment, the second RAT is a WiFi access network, following an IEEE 802.11 communications standard. The method therefore allows monitoring of a WiFi RAT while the wireless communications equipment maintains an active communications connection with a WiMAX RAT.

According to even another embodiment, monitoring a WiMAX RAT is possible while the wireless communications equipment maintains an active communications connection with a WiFi RAT.

According to still another embodiment, the scanning step of the at least one characteristic of the WiMAX access network is optimized by using an information contained in a Broadcast Control Pointer IE that indicates when a next DCD is sent, and/or using a fast digital signal processing scan enabling fast synchronization prior to receiving a Broadcast Control Pointer IE, and/or using an information contained in a Broadcast Control Pointer IE received on a certain channel, to perform scanning on different channels, prior to resuming scanning in that channel again where it has knowledge of the reception of a DCD.

Another aspect of the disclosure relates to a wireless communications equipment with means adapted for establishing and maintaining an active communications connection with a first and a second RAT providing different wireless access technologies to one or more communications networks for communications service; for performing a scan of at least one characteristic of the first or the second RAT while maintaining an active communications connection with the second or the first RAT respectively; and means adapted for performing said scan when there is an absence of transmitted signals through said active communications connection.

Various aspects of the disclosure will be better understood and further advantages will become apparent from the following description of illustrative embodiments.

BRIEF DESCRIPTION OF THE DRAWINGS

FIGS. 2 A and B shows two conventional system architectures used in bi-mode or dual mode wireless communications equipments.

DETAILED DESCRIPTION OF ILLUSTRATIVE EMBODIMENTS

Figure 3:
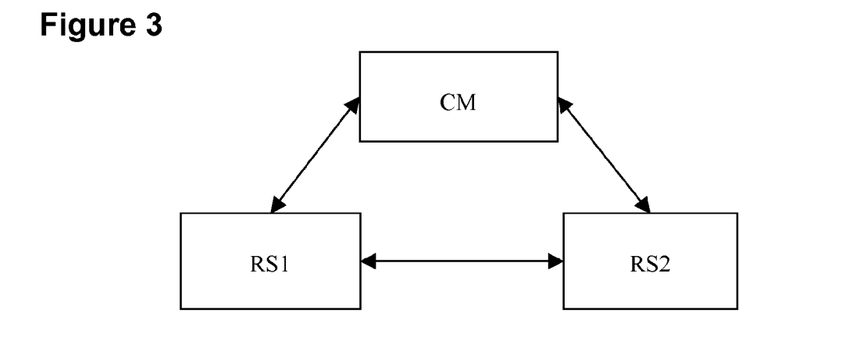
FIG. 3 shows a generic system architecture that may be used in a wireless communications equipment to implement a method for RAT monitoring according to an embodiment of the disclosure.

FIG. 3 shows a generic system architecture that may be used in a wireless communications equipment to implement a method for RAT monitoring according to an embodiment of the disclosure. Two RAT subsystem modules RS1 and RS2, corresponding each to a certain access technology (e.g. WiMAX and WiFi), are connected to each other and to a control module CM that controls and manages said RAT subsystem modules so that one can maintain an active established communications connection with a first RAT while the other carries monitoring of a second alternative RAT. For example, when the wireless communications equipment is located in a wireless system environment in which two different RATs (e.g. WiMAX and WiFi) coexist, the control module CM can select and establish a communications connection with a first RAT (e.g. WiMAX), via the first RAT subsystem module RS1, and scan at least one characteristic of the second RAT available (e.g. WiFi), via the second RAT subsystem module RS2, when the first RAT subsystem module RS1 does not transmit signals through said active established communications connection. According to an embodiment of the disclosure said absence of transmission signals in the active communications connection with the first RAT is detected and an indication provided to the second RAT subsystem module RS2 so that the scan is initiated. In an advantageous embodiment of the disclosure said absence of transmission signals are transmission absence periods, the duration of which can be determined and even controlled.

Figure 4:
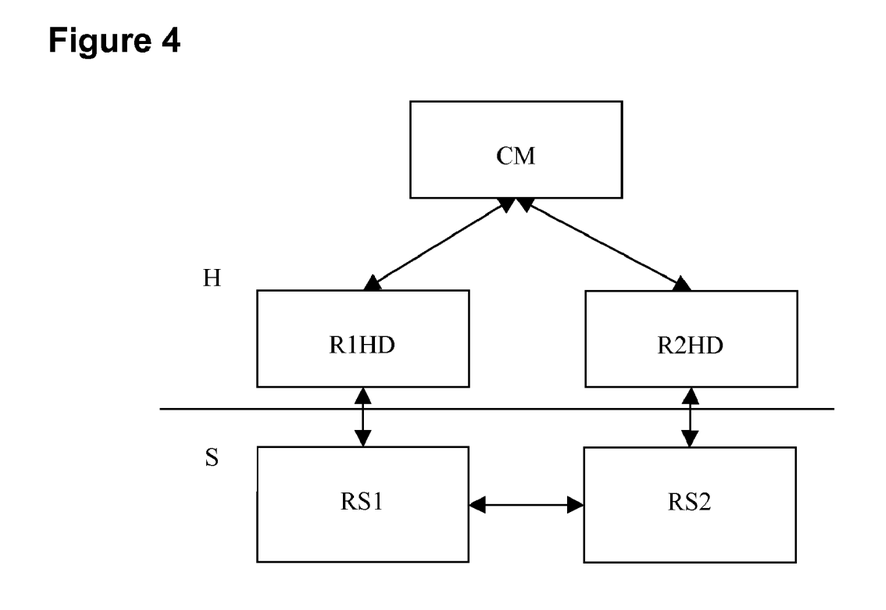
FIG. 4 is a first detailed system architecture block diagram of wireless communications equipment according to an exemplary embodiment of the disclosure.
Figure 5:
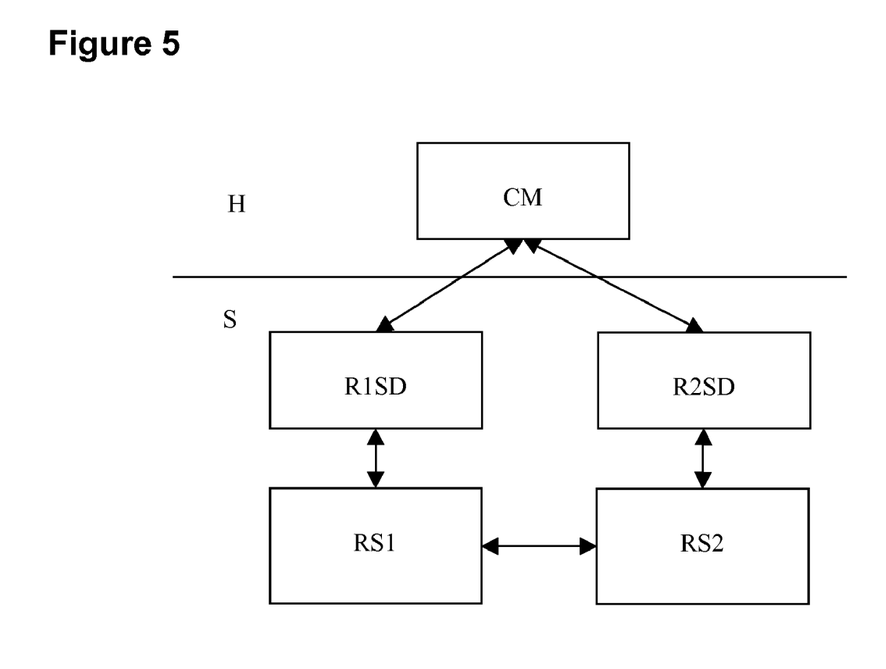
FIG. 5 is a second detailed system architecture block diagram of wireless communications equipment according to another exemplary embodiment of the disclosure.

Further detailed exemplary implementations of the system according to the disclosure are illustrated in FIGS. 4 and 5. In FIG. 4, the RAT subsystem modules RS1, RS2 are implemented in a system on chip module S, and are connected to a control module CM located on a host device H via respective host drivers R1HD and R2HD. In FIG. 5, the control module CM is located on a host device H and is connected to the two RAT subsystem modules RS1, RS2, located on a system on chip module S, via respective system on chip drivers R1SD and R2SD.

It shall be noted that all or part of the steps of the method according to the disclosure may be implemented on any of the modules shown in FIGS. 3 to 5, and control messages may be sent to any RAT subsystem module through or from the control manager CM and/or through one RAT subsystem module. Typically, the control module CM provides the user of the wireless communications equipment with information about the characteristics of the monitored RAT, and said information may be used for making automatic or manual handover decisions to the monitored RAT, e.g. when certain conditions are met.

According to a specific embodiment of the disclosure, the first RAT is a WiMAX access network and the second RAT is a WiFi access network, and monitoring of the WiFi RAT is carried by the wireless communications equipment according to the disclosure while maintaining an active communications connection with a WiMAX RAT. An aspect of the disclosure makes use of current state of the art standard implementation of WiFi scanning procedures: a) passive WiFi scanning, by decoding beacon frames broadcast by the APs at, e.g. default periods of 100 ms, or b) active WiFi scanning, by decoding probe response messages broadcast by the APs in reply to probe request message sent by the wireless communications equipment. Knowledge about the WiFi environment can be then reported, for example, to the control module CM that can be seen as the generally known WiFi connection manager tool hosted on a personal computer that reports to the user, for each AP, the signal strength, the AP identifier, the central frequency, etc.

Figure 6:
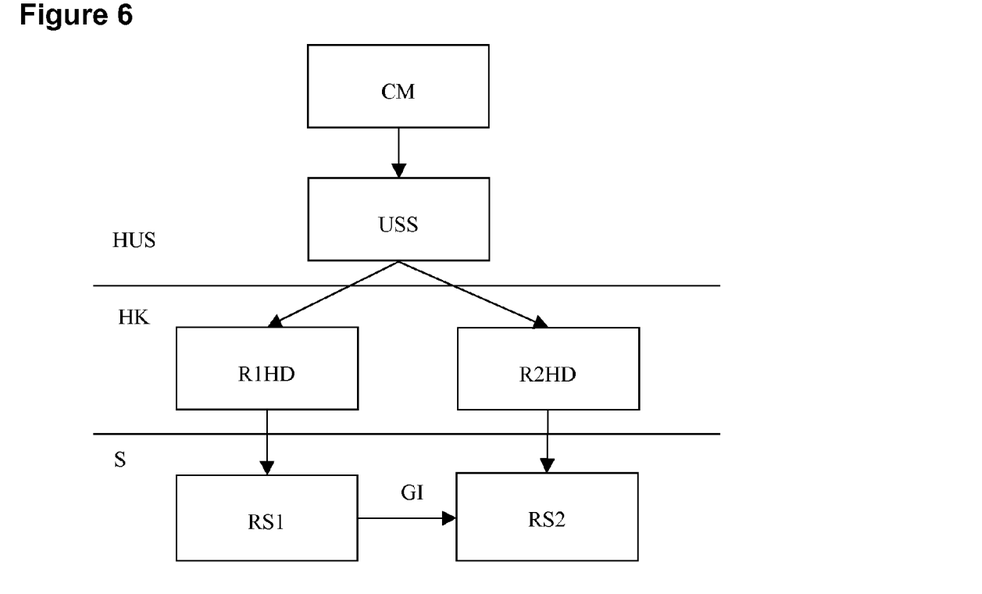
FIG. 6 is a third detailed system architecture block diagram of wireless communications equipment according to another exemplary embodiment of the disclosure.

An exemplary system architecture realization is illustrated in FIG. 6, comprising a control module CM and a user space support module USS, both implemented in a host user space HUS, two RAT subsystem host driver modules R1HD, R2HD implemented in a host kernel HK, and two RAT subsystems RS1, RS2, implemented in a system on chip module S and connected by a general-purpose interface GI. In another implementation, the general-purpose interface GI may even be removed and replaced by communication link through the host software, either at kernel or user space level.

According to further embodiments of the disclosure, WiMAX periods of absence will be used to perform WiFi scanning, and more particularly WiMAX sleep, scanning or idle periods as specified in section 6.3.21, 6.3.24 and 6.3.22.1.2 of the IEEE Std. 802.16e™-2005, *"IEEE Standard for Local and metropolitan area networks—Part 16: Air interface for Fixed and Mobile broadband Wireless Access Systems—Amendment 2: Physical and Medium Access Control Layers for Combined Fixed and Mobile Operation in licensed Bands and Corrigendum 1"*, 28 Feb. 2006, respectively. According to an aspect of the disclosure, the type of absence period (sleep, scanning or idle) and/or the duration of the absence period may be advantageously negotiated by the wireless communications equipment for performing active or passive WiFi scanning. In an embodiment of the disclosure, when WiMAX periods of absence (i.e. periods with no WiMAX signal transmission) are determined, the WiFi subsystem module, e.g. RS2, receives an indication to perform active or passive scanning of the wireless environment, such indication comprising, for example, WiFi channel numbers and minimum and maximum scanning periods corresponding to the WiMAX periods of absence. Such scanning indication can be sent at any time whenever a WiFi RAT information update is necessary, e.g. they may be user triggered or automated at periodic intervals. In one specific implementation, such scanning indication is sent to the corresponding WiFi subsystem module RS2 by way of an interrupt from the WiMAX subsystem module RS1 through the general-purpose interface GI.

The method and system of an exemplary aspect of the disclosure advantageously guarantees that no transmission signal will be sent through the established active WiMAX connection which could disturb the correct reception of the WiFi signals (e.g. a probe response or a beacon). According to specific embodiments, the WiMAX periods of absence could correspond to WiMAX sleep or scanning periods, which have the advantage that can be controlled and negotiated with the base station, i.e., the periods of absence can be set and negotiated in advance by the wireless communications equipment. In another embodiment, the system could determine and use the periods when WiMAX is in idle mode to optimize the WiFi scanning process.

Figure 7:
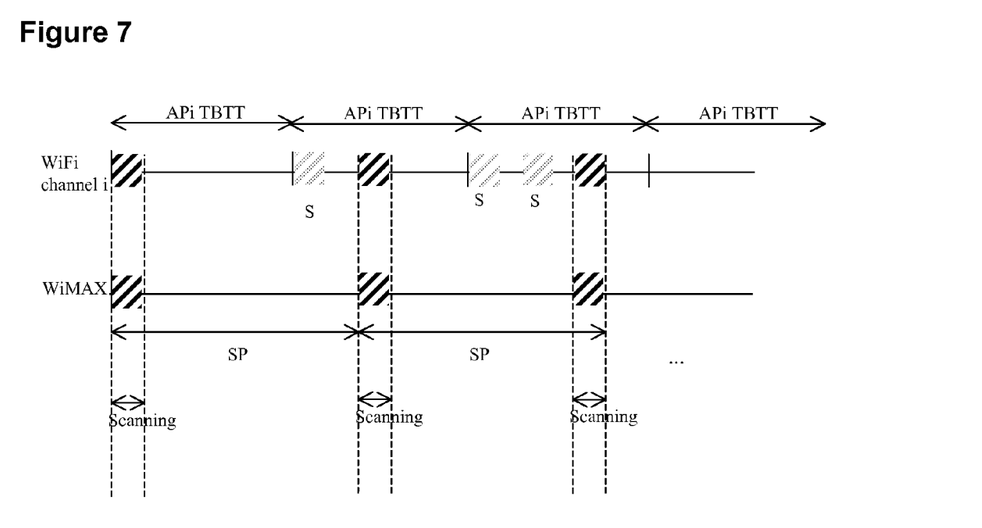
FIG. 7 shows a timing diagram of a method for allowing WiFi monitoring while maintaining an active WiMAX communications connection according to a specific embodiment of the disclosure.

For active WiFi scanning, when the WiFi subsystem module RS2 receives a scanning indication, the module will generate and send a probe request message through the RF chain and wait for the AP probe response messages. For passive WiFi scanning, it is advantageous to use WiMAX idle mode periods, which provides longer periods of absence. In another embodiment the duration of the WiMAX scanning and absence periods is adapted according to the APs in the neighborhood of the wireless communications equipment, for example, the WiMAX periodicity may be changed to, e.g. 150 ms with alternate sleep periods of 50 ms, or WiMAX scanning periods SP of e.g. 100 ms could be set for performing WiFi scanning. The latter is illustrated in FIG. 7, in which after 300 ms, for one channel, we can detect any APi sending beacons (supposing they are configured to their default target beacon transmission time TBTT value of 100 ms). We maximize therefore the probability of receiving all beacons sent by any APi on the specific scanned channel. Blocks S are the locations already scanned for a beacon.

Said WiMAX scanning periods may be set to be performed every 10 s or every minute, depending on the refreshing WiFi information period we wish to have on the control module for the WiFi RAT, and on the WiMAX connection quality (in order to avoid penalizing the WiMAX throughput by those unavailability or scanning periods).

Figure 8:
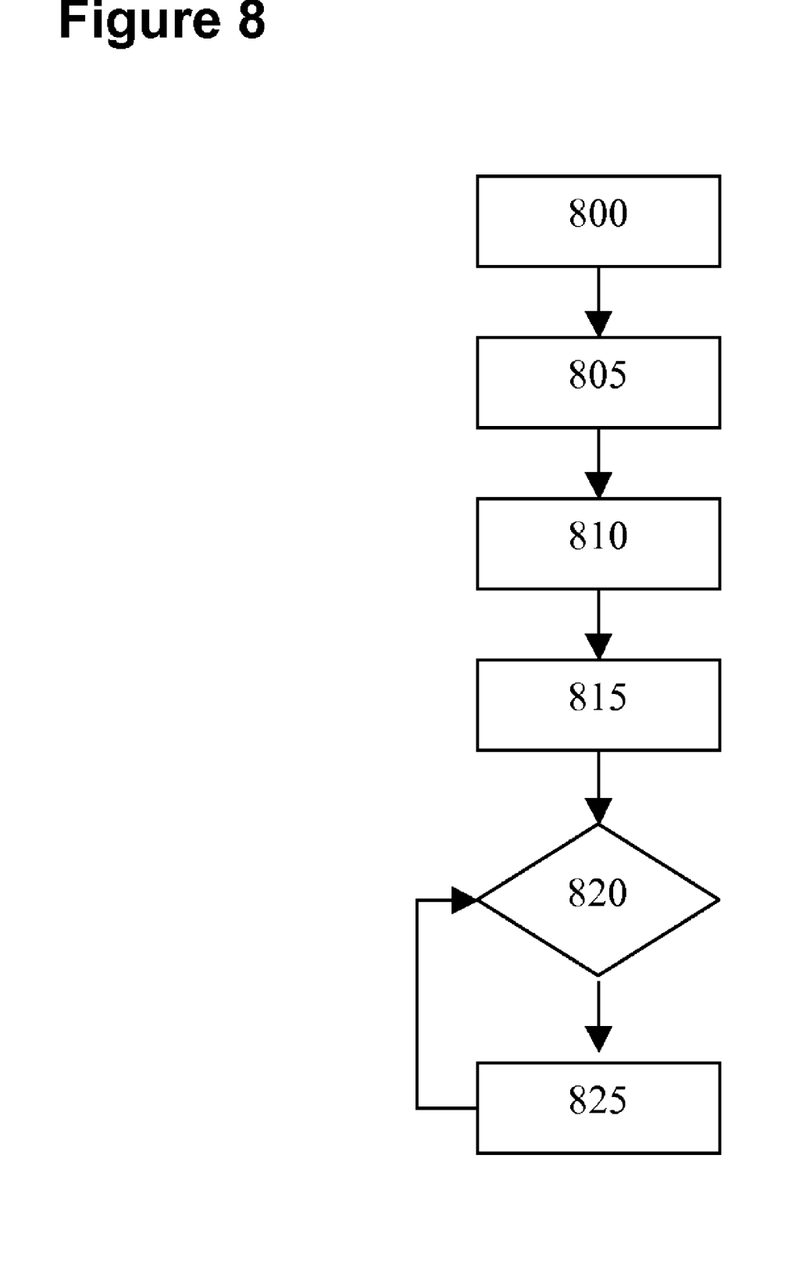
FIG. 8 shows an exemplary flowchart of a process for WiFi monitoring while maintaining an active communications connection in WiMAX, according to a specific embodiment of the disclosure.

FIG. 8 shows an exemplary flowchart of a process for WiFi monitoring while maintaining an established active communications connection in WiMAX, according to an embodiment of the disclosure. In step 800 a WiFi communications connection (in case one WiFi active communications connection has been established before deciding to switch to WiMAX) is shut down. In step 805 a communications connection is established with a network through a WiMAX RAT. In step 810 a certain WiMAX scan period for the established communications connection is requested to the base station; said scan period being dependent on the WiFi scan type (passive or active) that needs to be carried. Further, in step 815, the WiFi scan period is acknowledged by the base station. In step 820 it is determined if the WiMAX scan period has started and a WiFi scanning indication is sent to the WiFi subsystem. In step 825 WiFi scanning is performed and the information gathered is given to the wireless communications equipment control module CM. When WiFi scanning is finished, the process goes back to step 820, waiting that a new WiMAX scan period arrives.

According to another specific embodiment of the disclosure the first RAT is a WiFi access network and the second RAT is a WiMAX access network, and monitoring of the WiMAX RAT is carried by the wireless communications equipment according to an exemplary aspect of the disclosure while maintaining an active communications connection with a WiFi RAT. The objective is then to maintain knowledge of the WiMAX environment (base stations with which the wireless communications equipment could establish a connection), and send the scanning result information to the control module CM to enable the user or said wireless communications equipment to decide at any time to switch to WiMAX.

Figure 9:
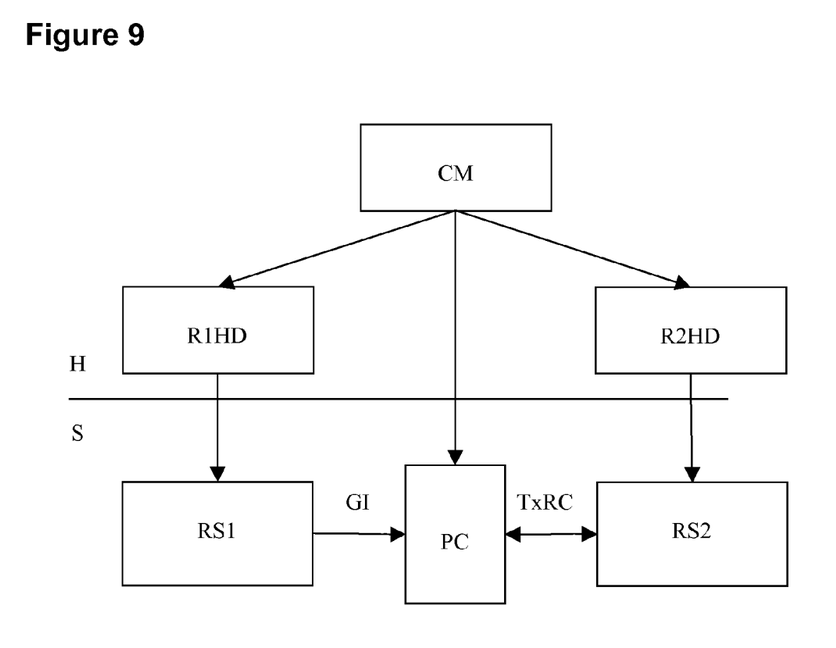
FIG. 9 shows a fourth detailed system architecture block diagram of wireless communications equipment according to another exemplary embodiment of the disclosure.

A first exemplary system architecture implementation for WiMAX monitoring, according to an aspect of the disclosure, is illustrated in FIG. 9, comprising a control module CM, a WiMAX subsystem host driver R1HD, a WiFi subsystem Host driver 2HD, a WiMAX subsystem module RS1, a Packet Traffic Arbitration (PTA) controller PC and a WiFi subsystem module RS2. The PTA controller PC is used to control transmission of the WiFi subsystem module RS2 through transmission request/confirm link TxR/C. A general-purpose interface GI is used to interface the WiMAX subsystem module RS1 and the PTA controller PC.

According to the above specific embodiment of the disclosure, a way of preventing the WiFi subsystem module RS2 from transmitting while the WiMAX subsystem module RS1 is performing channel scanning, is to use the PTA to block any transmission packet from the WiFi subsystem module RS2.

Figure 10:
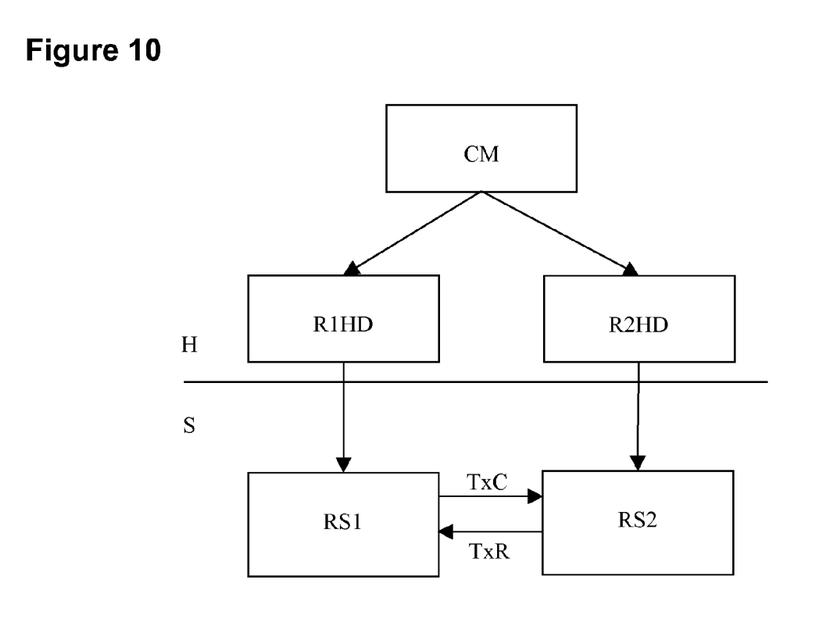
FIG. 10 shows a fifth detailed system architecture block diagram of wireless communications equipment according to another exemplary embodiment of the disclosure.

A second exemplary system architecture implementation for WiMAX monitoring, according to the disclosure, is illustrated in FIG. 10, in which both RAT subsystems (WiMAX-WiFi) RS1, RS2 are connected just by 2 links, one for transmission request TxR and the other for transmission confirmation TxC.

Figure 11:
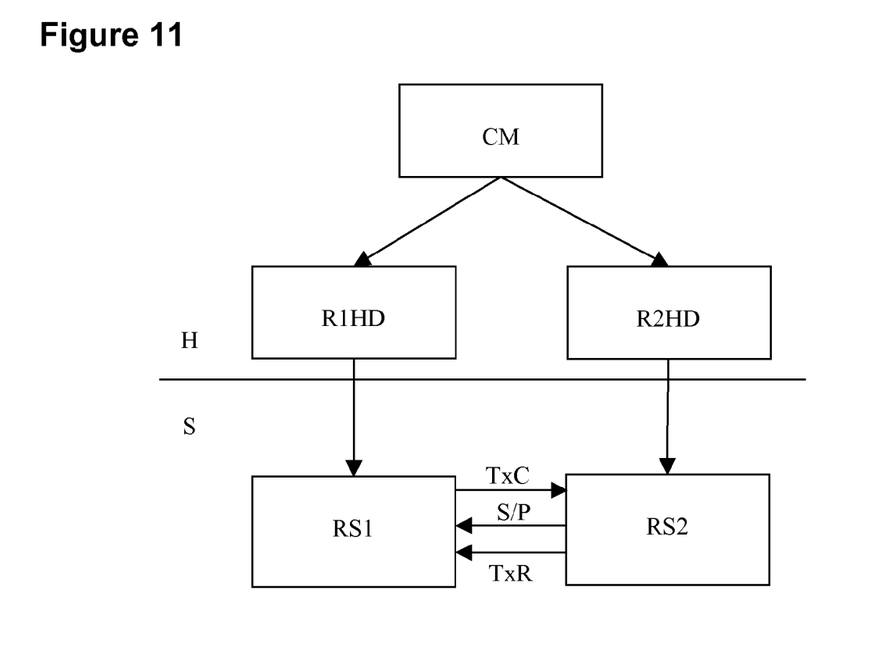
FIG. 11 shows a sixth detailed system architecture block diagram of wireless communications equipment according to another exemplary embodiment of the disclosure.

Still a third exemplary system architecture implementation for WiMAX monitoring, according to the disclosure, is illustrated in FIG. 11, in which three links for communication between the RAT subsystems (WiMAX-WiFi) RS1, RS2 are used, one for transmission request TxR, one for transmission confirmation TxC and one for providing status or priority information S/P.

In FIGS. 9 to 11 the WiMAX subsystem RS1 or PTA controller PC controls the transmission confirmation link TxC, which serves to indicate that the WiMAX subsystem is (or is not) transmitting, and to prevent the WiFi subsystem module RS2 from transmission. The WiFi subsystem module RS2 controls the transmission request link TxR to indicate when it is (or is not) transmitting. Before starting a transmission, the WiFi subsystem module RS2 will sample the transmission confirmation link TxC to decide whether to transmit or not. The status or priority link S/P is used to differentiate between a low and a high priority WiFi traffic.

Current WiMAX scanning implementations are based on a passive approach that comprises the reception of messages broadcast periodically by the base stations. For a certain channel, the wireless communications equipment synchronizes with the base station and then decodes the description of the downlink frame until it indicates that a downlink channel descriptor (DCD) is transmitted. If decoding of the DCD is successful, the wireless communications equipment can proceed to the reception of the system identity information advertisement message (SII-ADV) providing the supported network service provider (NSP) on the channel. Otherwise, the wireless communications equipment has to wait for the retransmission of another DCD until it successfully decodes it. Once the DCD, and if needed the SII-ADV, is properly decoded, the wireless communications equipment can move to another WiMAX channel. Since the DCD and SII-ADV are received after long periods (e.g. every second), the ability to scan properly in WiMAX is much more restrictive than in the previously exposed case of passive WiFi scanning. Nevertheless, and also according to the disclosure, the WiMAX monitoring method can be optimized in the following ways, which can be applied individually or in any combination:

1. The WiMAX subsystem module RS1 can use the information contained in a Broadcast Control Pointer IE that indicates when the next DCD is sent. Once the WiMAX subsystem module RS1 knows when to receive the DCD, it can go back to an operation mode in which it does not attempt to receive nor transmit anything, therefore leaving this period for the WiFi subsystem module RS2 to continue with its normal activity in the established communications connection.
2. The WiMAX subsystem module RS1 can use a fast digital signal processing scan enabling fast synchronization prior to receiving the Broadcast Control Pointer IE in order to know when to restart scanning a certain channel.
3. The WiMAX subsystem module RS1 can use the knowledge of the Broadcast Control Pointer IE received on a certain channel, which indicates when the next DCD comes in said scanned channel, to perform scanning on different channels, prior to resuming scanning in that channel again where it has knowledge of the reception of the DCD.

Figure 12:
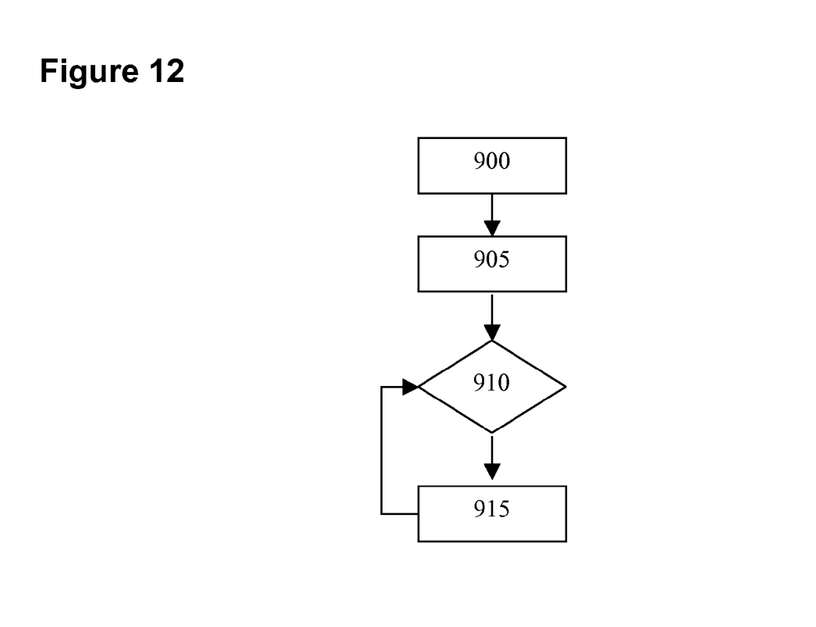
FIG. 12 shows an exemplary flowchart of a process for WiMAX monitoring while maintaining an active communications connection in WiFi, according to another specific embodiment of the disclosure.

FIG. 12 shows an exemplary flowchart of a process for WiMAX monitoring while maintaining an established active communications connection in WiFi, according to an embodiment of the disclosure. In step 900 a WiMAX communications connection (in case one WiMAX active communications connection has been established before deciding to switch to WiFi) is shut down. In step 905 a communications connection is established with a network through a WiFi RAT. In step 910 a WiMAX scan trigger event (either periodically set or manually triggered) is received and the procedure follows with step 915, in which WiMAX scanning is performed and the information gathered is given to the wireless communications equipment control module CM. During said WiMAX scan, the WiFi subsystem module RS2 is not allowed to transmit. When WiFi scanning is finished, the process goes back to step 910, waiting that a new WiMAX scan trigger event arrives.

Figure 13:
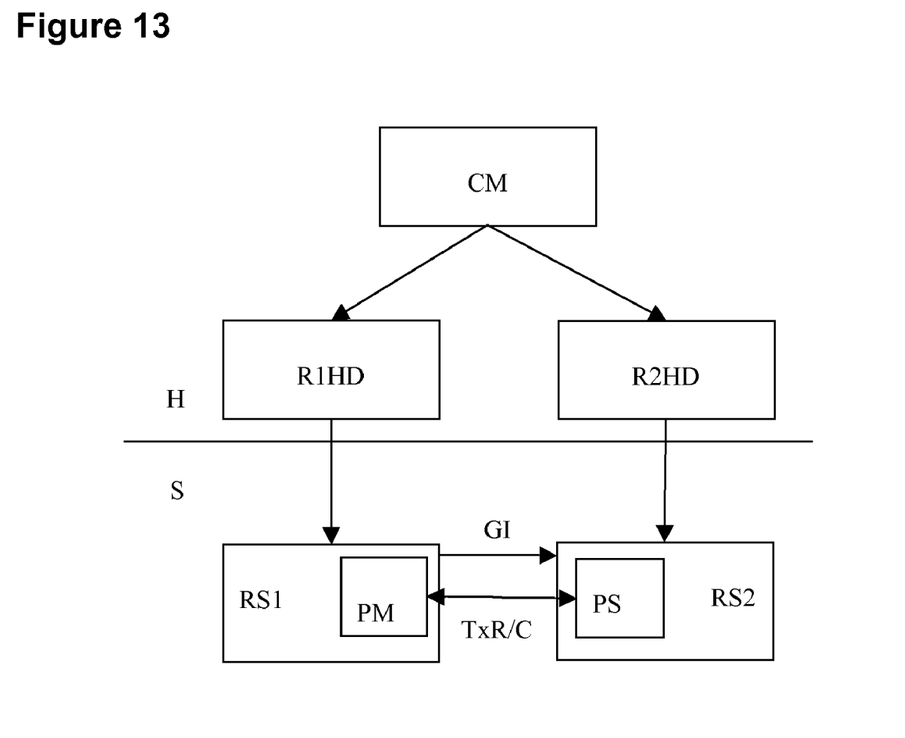
FIG. 13 shows still another detailed system architecture block diagram of wireless communications equipment according to a specific embodiment of the disclosure.

In another embodiment of the disclosure, the functionality of WiFi monitoring while connected in WiMAX, is implemented together with the functionality of WiMAX monitoring while connected in WiFi. This is advantageous for wireless communications equipments or users that want to be able to monitor both WiFi and WiMAX RAT characteristics while connected with a different RAT. An exemplary system architecture implementation is shown in FIG. 13, comprising a control module CM, a WiMAX subsystem host driver R1HD, a WiFi subsystem host driver R2HD, a WiMAX subsystem module RS1, a WiFi subsystem module RS2, a PTA master module PM and PTA slave module PM. The WiMAX subsystem module RS1 is connected to the WiFi subsystem module RS2 by a general-purpose interface GI and the PTA master module PM and PTA slave module PM are connected by means of a transmission request or confirmation link TxR/C.

Although the present disclosure has been described with reference to one or more examples, workers skilled in the art will recognize that changes may be made in form and detail without departing from the scope of the disclosure and/or the appended claims.

What is claimed is:

1. A method for radio access technology (RAT) monitoring, in a wireless system environment comprising a wireless communications equipment and at least two different RATs that coexist for providing to said wireless communications equipment access to one or more communications networks for communications service; the wireless communications equipment comprising at least two electronic subsystems, each adapted for establishing and maintaining an active communications connection with a certain one of said at least two different RATs;

the wireless communications equipment selecting at least a first RAT, among all the RATs available in a certain geographical area, for establishing said at least one active communications connection, according to at least one monitored characteristic of said at least first RAT;

the monitoring method comprising:

a second electronic subsystem of said wireless communications equipment initiating a scanning step of at least one characteristic of a second RAT available for communication in said geographical area while a first electronic subsystem of the wireless communications equipment maintains an active communications connection with said first RAT, the second electronic subsystem providing an indication when it initiates the scanning step, performing said scanning step of the at least one characteristic of the second RAT when the wireless communications equipment does not transmit signals through said active communications connection maintained with the first RAT, and utilizing said indication to block the transmission of signals in the active communications connection maintained between the first electronic subsystem of the wireless communications equipment and the first RAT.

2. The method for RAT monitoring of claim 1, the method comprising: determining an absence of transmitted signals in the active communications connection maintained between a first electronic subsystem of the wireless communications equipment and the first RAT, and providing an indication to the second electronic subsystem of said wireless communications equipment when said absence of transmitted signals is determined.

3. The method for RAT monitoring of claim 2, wherein determining an absence of transmitted signals in the active communications connection comprises determining a duration and/or type of absence of transmitted signals according to a communications protocol of the first RAT, and the indication provided to the second electronic subsystem comprises information about said determined duration and/or type.

4. The method for RAT monitoring of claim 2, wherein determining an absence of transmitted signals in the active communications connection comprises determining a certain duration and/or type of absence of transmitted signals according to a communications protocol of the first RAT, and the indication to the second electronic subsystem is provided when said certain duration and/or type is determined.

5. The method for RAT monitoring of claim 1, wherein the wireless communications equipment sets a duration of a period in which it does not transmit signals through said active communications connection maintained with said first RAT, by sending a request message comprising said period duration to an access node providing said first RAT communications service.

6. The method for RAT monitoring of claim 1, wherein the wireless communications equipment sets a type of a period in which it does not transmit signals through said active communications connection maintained with said first RAT, by sending a request message comprising said period type to an access node providing said first RAT communications service.

7. The method for RAT monitoring of claim 2, wherein determining an absence of transmitted signals in the active communications connection comprises determining a certain duration and/or type of absence of transmitted signals according to a communications protocol of the first RAT, and the indication to the second electronic subsystem is provided when said certain duration and/or type is determined, and wherein the duration of said period of absence is set depending on a periodicity of broadcast information sent by access nodes providing said second RAT communications service and located in the neighborhood of the wireless communications equipment.

8. The method for RAT monitoring of claim 1, wherein the first RAT is a WiFi access network and the second RAT is a WiMAX access network.

9. The method for RAT monitoring of claim 1, wherein the first RAT is a WiMAX access network and the active communications connection is a WiMAX connection.

10. The method for RAT monitoring of claim 6, wherein the first RAT is a WiMAX access network and the wireless communications equipment sets the type of the period in which it does not transmit signals through said active communications connection as a WiMAX sleep, scan or idle period.

11. The method for RAT monitoring of claim 1, wherein the first RAT is a WiMAX access network and the second RAT is a WiFi access network.

12. The method for RAT monitoring of claim 1, wherein the first RAT is a WiFi access network and the second RAT is a WiMAX access network.

13. The method for RAT monitoring of claim 12, wherein the scanning step of the at least one characteristic of the WiMAX access network is optimized by using information contained in a Broadcast Control Pointer IE that indicates when a next downlink channel descriptor DCD is sent, and/or using a fast digital signal processing scan enabling fast synchronization prior to receiving a Broadcast Control Pointer IE, and /or using information contained in a Broadcast Control Pointer IE received on a certain channel, to perform scanning on different channels, prior to resuming scanning in that channel again where it has knowledge of the reception of a DCD.

14. A wireless communications equipment comprising:
means adapted for:
  establishing and maintaining an active communications connection with a first and a second radio access technology (RAT) providing different wireless access technologies to one or more communications networks for communications service;
  initiating and performing a scan of at least one characteristic of the first or the second RAT while maintaining an active communications connection with the second or the first RAT, respectively;
  providing an indication when the scan is initiated;
  using said indication to block the transmission of signals in the active communications connection maintained with the second or the first RAT; and
  performing said scan when there is an absence of transmitted signals through said active communications connection.

* * * * *